United States Patent
Shteyn

(10) Patent No.: US 7,620,703 B1
(45) Date of Patent: Nov. 17, 2009

(54) TOPICAL SERVICE PROVIDES CONTEXT INFORMATION FOR A HOME NETWORK

(75) Inventor: Yevgeniy Eugene Shteyn, Cupertino, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 2046 days.

(21) Appl. No.: 09/635,549

(22) Filed: Aug. 10, 2000

(51) Int. Cl.
 G06F 15/177 (2006.01)
(52) U.S. Cl. ..................................... 709/220
(58) Field of Classification Search ............... 725/51, 725/34, 78; 709/219, 218, 203, 217, 220–227; 370/352, 329
See application file for complete search history.

(56) References Cited

U.S. PATENT DOCUMENTS

| | | | |
|---|---|---|---|
| 5,650,831 A * | 7/1997 | Farwell ............... | 348/734 |
| 5,737,532 A * | 4/1998 | DeLair et al. ......... | 709/219 |
| 5,751,956 A * | 5/1998 | Kirsch ............... | 709/203 |
| 5,761,673 A * | 6/1998 | Bookman et al. ...... | 709/311 |
| 5,764,910 A * | 6/1998 | Shachar .............. | 709/223 |
| 5,790,977 A * | 8/1998 | Ezekiel .............. | 702/122 |
| 5,956,487 A | 9/1999 | Venkatraman et al. | |
| 5,961,645 A * | 10/1999 | Baker ................ | 713/201 |
| 6,005,565 A * | 12/1999 | Legall et al. ......... | 345/721 |
| 6,167,441 A * | 12/2000 | Himmel .............. | 709/217 |
| 6,226,642 B1 * | 5/2001 | Beranek et al. ........ | 707/10 |
| 6,288,716 B1 * | 9/2001 | Humpleman et al. .... | 715/733 |
| 6,311,197 B2 * | 10/2001 | Mighdoll et al. ....... | 715/513 |
| 6,349,410 B1 * | 2/2002 | Lortz ................ | 725/110 |
| 6,396,544 B1 * | 5/2002 | Schindler et al. ...... | 348/461 |
| 6,412,008 B1 * | 6/2002 | Fields et al. ......... | 709/228 |
| 6,421,067 B1 * | 7/2002 | Kamen et al. ......... | 345/719 |
| 6,477,576 B2 * | 11/2002 | Angwin et al. ........ | 709/226 |
| 6,499,138 B1 * | 12/2002 | Swix et al. .......... | 725/38 |
| 6,546,419 B1 * | 4/2003 | Humpleman et al. .... | 709/223 |
| 6,584,096 B1 * | 6/2003 | Allan ................ | 370/352 |
| 6,665,721 B1 * | 12/2003 | Hind et al. .......... | 709/227 |
| 6,684,256 B1 * | 1/2004 | Warrier et al. ........ | 709/238 |
| 6,735,619 B1 * | 5/2004 | Sawada .............. | 709/212 |
| 6,738,362 B1 * | 5/2004 | Xu et al. ............ | 370/329 |
| 6,785,720 B1 * | 8/2004 | Seong ............... | 709/220 |
| 6,804,720 B1 * | 10/2004 | Vilander et al. ....... | 709/229 |
| 6,919,792 B1 * | 7/2005 | Battini et al. ........ | 340/5.32 |

(Continued)

FOREIGN PATENT DOCUMENTS

CA          EP 1017206 A2  *  7/2000

OTHER PUBLICATIONS

Duberman, David, "Daily Spectrum: Interactive Media & Online Developer News", Feb. 1996, www.3dsite.com, pp. 1-10.*

(Continued)

*Primary Examiner*—Krisna Lim
(74) *Attorney, Agent, or Firm*—Larry Liberchuk

(57) ABSTRACT

A consumer apparatus is made an intuitive component of a user-interface to a topical server. A specific user-interaction with the apparatus or its proxy on the home network causes a request to be sent to a specific server on the Internet based on a predefined URL. The home network receives a particular web page from the server with content information dedicated to the context of use of the apparatus.

15 Claims, 3 Drawing Sheets

U.S. PATENT DOCUMENTS

| | | | |
|---|---|---|---|
| 6,993,785 B1 * | 1/2006 | Na | 725/80 |
| 7,072,945 B1 * | 7/2006 | Nieminen et al. | 709/217 |
| 7,127,734 B1 * | 10/2006 | Amit | 725/80 |
| 7,200,644 B1 * | 4/2007 | Flanagan | 709/219 |
| 2001/0038392 A1 * | 11/2001 | Humpleman et al. | 345/733 |
| 2002/0178452 A1 * | 11/2002 | Lecomte | 725/78 |

OTHER PUBLICATIONS

Form PCT/ISA/210 of PCT/EP01/08757.*

* cited by examiner

TOPICAL SERVICE PROVIDES CONTEXT INFORMATION FOR A HOME NETWORK

FIELD OF THE INVENTION

The present invention pertains to the field of user interaction with networked consumer devices. More particularly, this invention relates to user access to web-based services associated with a particular consumer device or with a group of such devices.

BACKGROUND

The expression "home network" generally refers to a collection of interconnected apparatus in and around the home. An apparatus on the network can communicate with one or more of the other apparatus so as to provide distributed functionalities and synergy through interoperability, typically under control of software applications and macro's. The network provides functionalities such as entertainment and education (e.g., audio and video play-out, electronic content guides, including EPGs), control (e.g., thermostat, lights, sprinkler, kitchen appliances) and monitoring (e.g., security system, baby monitor).

A variety of software architectures are being developed for implementing a home network. Examples thereof are HAVi, Home API, UPnP, Jini, HomeRF, HomePNA, etc.

A more specific example of a home network is discussed in U.S. Ser. No. 09/222,403 filed Dec. 29, 1998 for Doreen Cheng for HOME CONTROL SYSTEM WITH DISTRIBUTED, NETWORKED DEVICES, and incorporated herein by reference. Devices within a locale, such as a home, are controlled by detecting the presence of an identified user within different areas of the locale. The devices within the areas are controlled in response to each identified user's preferences. The locating and control devices may be stand-alone devices, or integrated within other electronic devices, such as televisions, stereos, computers, and so on. Also provided in this invention are user task modules that suggest control actions based on the location of the user, the current context, and a profile of the user based upon the user's prior actions. The determination of each user's location is facilitated by the use of a tracker module that the user carries about. The user may determine the degree of automation to be applied at any time.

Another example is discussed in U.S. Ser. No. 09/568,932 file May 11, 2000 for Eugene Shteyn and Ruud Roth for ELECTRONIC CONTENT GUIDE RENDERS CONTENT RESOURCES TRANSPARENT, incorporated herein by reference. This document relates to a data management system that combines the data of an EPG with other data for other types of content information, typically within the context of a home entertainment system. The system comprises a data base for representing schedule information associated with scheduled content information from a content provider such as a broadcasting station or a video-on-demand (VOD) service. In addition, the data base also represents inventory information that is associated with content information available from another resource, e.g., as recorded at the consumer's digital Personal TV Receiver during previous broadcasts, or from a CD or DVD jukebox. Accordingly, this document introduces a general type of an electronic guide, herein after referred to as an electronic content guide (ECG).

Yet another example is discussed in U.S. Ser. No. 09/160,490 filed Sep. 25, 1998 for Adrian Turner et al., for CUSTOMIZED UPGRADING OF INTERNET-ENABLED DEVICES BASED ON USER-PROFILE, herein incorporated by reference. This document discusses a server system that maintains a user profile of a particular end-user of consumer electronics network-enabled equipment and a data base of new technical features for this type of equipment. If there is a match between the user-profile and a new technical feature, and the user indicates to receive information about updates or sales offers, the user gets notified via the network of the option to obtain the feature.

Still another example is given by U.S. Ser. No. 09/189,535 filed Nov. 10, 1998 for Eugene Shteyn for UPGRADING OF SYNERGETIC ASPECTS OF HOME NETWORKS, incorporated herein by reference. This document relates to a server that has access to an inventory of devices and capabilities on a user's home network. The inventory is, for example, a look-up service as provided by HAVi or Jini architecture. The server has also access to a data base with information of features for a network. The server determines if the synergy of the apparatus present on the user's network can be enhanced based on the listing of the inventory and on the user's profile. If there are features that are relevant to the synergy, based on these criteria, the user gets notified.

SUMMARY OF THE INVENTION

The above indicate that the apparatus interconnected in a home network open up possibilities for new synergistic functionalities to the benefit of the user. The software architectures for the home networks typically make the user-interaction task-centric, rather than device-centric. If the network has a gateway for connecting to the Internet or to another data network, even more functionalities can be implemented by using resources on the Internet such as application servers and information stores. An example hereof is discussed in U.S. Ser. No. 09/519,546 filed Mar. 6, 2000 for Erik Ekkel et al., for PERSONALIZING CE EQUIPMENT CONFIGURATION AT SERVER VIA WEB-ENABLED DEVICE. This document relates to facilitating the configuring of CE equipment by the consumer through delegating this configuring to an application server on the Internet. The consumer enters his/her preferences in a specific interactive Web page through a suitable user-interface of an Internet-enabled device, such as a PC or set-top box or digital cellphone. The application server generates the control data based on the preferences entered and downloads the control data to the CE equipment itself or to the Internet-enabled device.

The inventor proposes a new type of service that enables the user of a home network to take advantage of the network connection to the Internet. More specifically, the invention relates to a method of providing a service to a user of a consumer apparatus. The method comprises maintaining a web page on a server for providing to the user content information about a context of use of the apparatus, and enabling the user to initiate retrieval of the web page from the server via a data network through sending to the server a request based on the URL that is associated with the apparatus. The URL is retrieved from, e.g., the apparatus or from a proxy representative of the apparatus, and sent by the apparatus, proxy or an intermediate device on the home network. The web page is received by the apparatus associated with the URL or by another device on the home network that is capable of displaying or playing out the web page. Thus, the following scenarios are possible, given here by way of example.

The user causes a garbage can or its proxy to initiate retrieval of a web page through a URL associated with the garbage can. The web page indicates the schedule of the local garbage collection service. The garbage truck may have a GPS unit to allow tracking its progress along the route to give the user an indication of the time the truck shows up at the user's street address.

The user causes a DVD player or its proxy to initiate retrieval of a web page indicated by the URL associated with the type "DVD player". The web page provides information about new DVD's in the user's preferred categories or about the most popular DVDs on sale. The URL is pre-programmed or user-programmed in order to connect to a specific service on the Web. User-profiling may be part of this service so as to more accurately provide the user with information.

The user causes a blender (kitchen appliance) or its proxy to initiate retrieval of a web page indicated by the URL representative of the type "blender". The web page provides information on recipes for making drinks or creamy soups. The recipes get updated frequently. The Web page may have other blender-relevant information and links to other pages useful within the blender context.

The user may cause his/her motorcycle or its proxy to submit a request to a server on the Internet based on the URL to get a web page on topics relevant within the context of using, owning, riding, or maintaining a motorcycle. The Web page may include targeted advertisements, e.g., of local dealers.

As another example, the user has a proxy for a book case on the network that can be caused to submit a request based on a URL associated with "books". The URL points to, e.g., the home page of an online book retail shop or the town's library to enable the user to browse the inventory and purchase or order a specific book.

The connection of the apparatus or its proxy to the home network enables to retrieve, display or play out the web page on, e.g., a PC monitor or the TV monitor, a touch screen remote such as the PRONTO™ of Philips Electronics, or a dedicated Web pad, or via a speaker system if the web page contains audio information. Note that the apparatus in above examples, i.e., the garbage can, the DVD player, the blender, and the motorcycle itself now has become, in the perception of the user, a topical server. The topical server supplies content information about the apparatus, about its context of its usage. Another way of looking at the invention is that the apparatus has become an icon as if it were part of a graphical user-interface (GUI). Causing the apparatus or its proxy to submit a request based on the URL is similar to clicking an icon on a GUI, the icon being some sort of a graphical representation or metaphor of the documents or application or service associated with it. In the invention, the apparatus is the icon. Accordingly, the user interaction with the networked environment has become highly intuitive.

The external service and the apparatus are intuitively associated with each other. The access is easily obtained, low cost, and user friendly. The invention uses a direct access means to invoke display of a web page for an external service associated with the apparatus. The service is associated with consumable content specific to the context of usage of the apparatus. The type of apparatus defines the context. The user invokes retrieval of a web page representing a service. The service advertises consumable content specific to the usage context. This supports an attractive business model for device manufacturers and the service providers. It enables the manufacturers to partner with external services in order to provide the user at his or her convenience with easy access to context-relevant content that enhances usage of the apparatus. The revenue received by the service provider as a result of the user interaction with the designated web page can be shared between the service provider and the device manufacturer.

In one aspect of the invention, the manufacturer provides a preprogrammed remote control for a network-enabled consumer apparatus. In a one-step interaction with the remote control, a user retrieves an external web page with content that is specific to the apparatus. The web page is presented through a device pre-determined by the user. The user may order and/or retrieve at least one service item from the web page, e.g., through a buy button.

In another aspect of the invention, an intermediary device captures a request for access to a service associated with the apparatus, e.g., by intercepting an IR or RF signal from a remote control. The intermediary device retrieves the address of the web page, related to the service, from the target apparatus. The address can also be obtained from an internal or external service lookup facility. The intermediary device then proceeds with retrieving and presenting or relaying the web page in the manner described above.

In yet another aspect of the invention the user can designate a preferred service provider associated with the target apparatus, i.e., the URL is user selectable. The user may also choose a service provider from a set of choices supplied by the apparatus itself or by the intermediary device. Note that this supports a subsidized business model for the manufacturer or distributor, wherein a preprogrammed URL can be leased or otherwise acquired from the manufacturer by the service provider.

In one more aspect of the invention, in a user environment with a plurality of controllable devices, the target service provider is determined by the mode of the system's user interface means, e.g., a remote control, device front panel, etc.

In yet another aspect of the invention the target service is associated with a consumer electronics device and the service web page address is determined by the content played out by the device.

In another aspect of the invention the URL is associated with the apparatus at a retail location, such as electronics store, a motorcycle dealership, etc. Note that this supports a business model for the manufacturer, distributor and retailer to improve channel distribution options, increase and customize service-offering space. Within this context, see, for example, U.S. Ser. No. 09/349,676 filed Jul. 8, 1999 for Kristin Ondeck for AFTER-SALES CUSTOMIZATION SPECIFIED BY RETAILER ACTS AS INCENTIVE, incorporated herein by reference. This document relates to a machine-implemented method of doing business to stimulate commercial activities. A customer notifies a manufacturer or a dedicated service provider, of the purchase of merchandise from a specific retailer. Upon being notified, the manufacturer or service provider customizes a portal or home page for the customer by temporarily adding an advertisement banner associated with the retailer.

Above examples illustrate the invention with external servers on the Internet. The invention can also be used for retrieval of topical information, related to the context of usage of the apparatus, from an internal resource or server residing on the home network. A specific user-input to an apparatus or the user triggering its proxy initiates retrieval of this information under control of a predetermined URL from the home network server. For example, triggering a car's proxy on the home network causes, e.g., an HTML page to be rendered at a predetermined display to inform the user of the date of the next scheduled oil change as entered into the home system by the service station via email upon the previous service. As another example, the triggering of the apparatus or its proxy causes the electronic content guide, illustrated in U.S. Ser. No. 09/568,932 mentioned above, to be retrieved.

In order to clarify the invention with respect to documents and equipment available in the public domain, consider U.S. Pat. No. 5,956,487, herein incorporated by reference. This document relates to embedding into a device a Web access functionality to enable low cost, widely accessible and enhanced user interface functions for control of the device. A web server in the device provides access to the user interface functions for the device through a device web page. A network interface in the device enables access to the web page by a web browser such that a user of the web browser accesses the user interface functions for the device through the web page. Note that this document neither teaches nor suggests going beyond a web page with control functions for a device in order to provide information about a context of usage. The invention, on the other hand, lets the device become a topical server, through the device itself or its proxy on the network.

Also consider the Tivo HDD-based digital video recorder. The Tivo service provides features and updates by enabling the recorder to automatically make a daily phone call to the server to get the up-to-date control information in the form of an EPG. In the invention, the user triggers the retrieval of a web page with information about a context of usage through a URL.

BRIEF DESCRIPTION OF THE DRAWINGS

The invention is explained in further detail, by way of example, and with reference to the accompanying drawing, wherein.

Throughout the figures, same reference numerals indicate similar or corresponding features.

DETAILED DESCRIPTION

Figure 1:
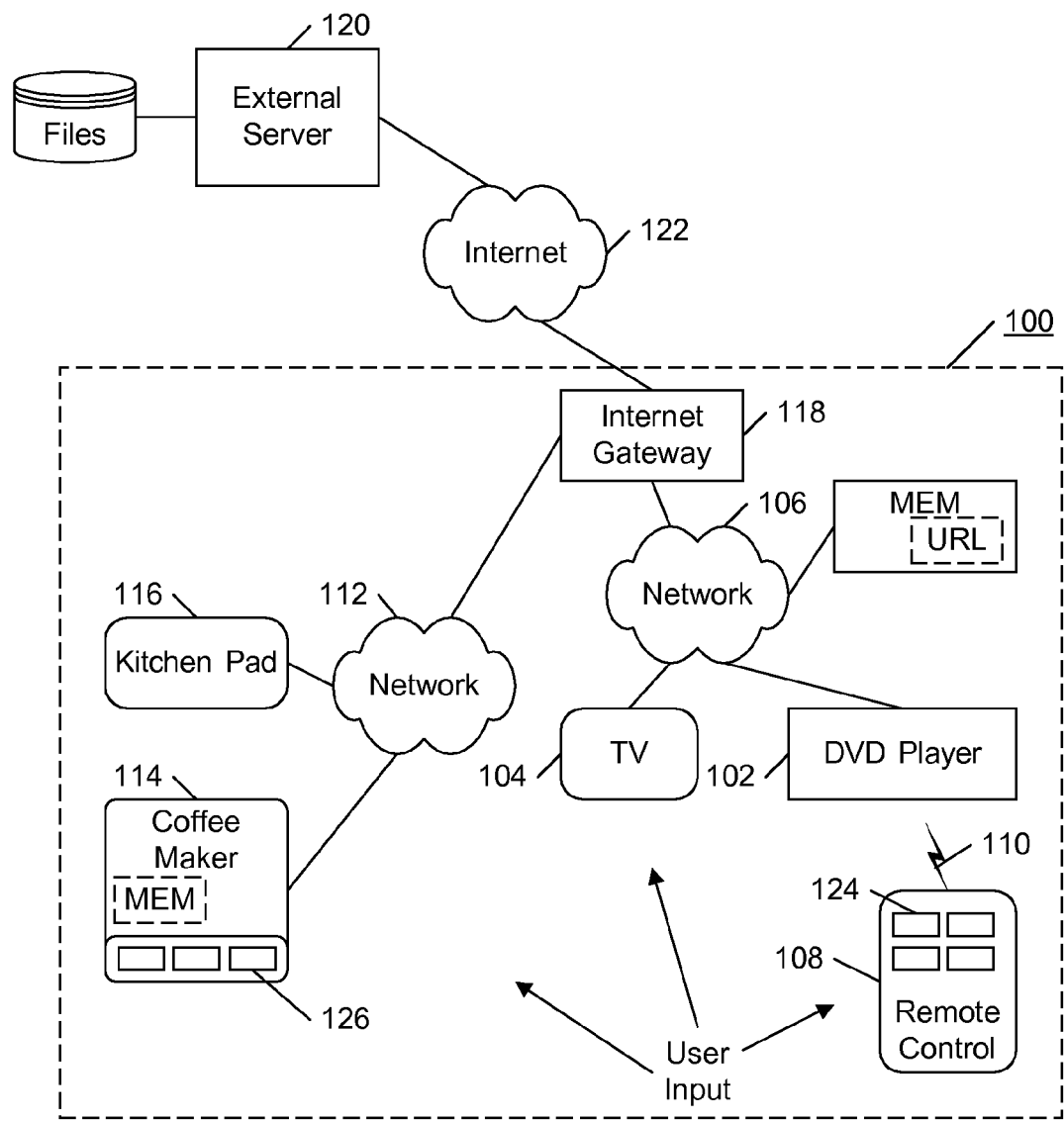
FIGS. 1-2 are block diagrams of home networks configured to enable a user to access external services for information supply about the context of usage per apparatus.

FIG. 1 is a block diagram of a network environment 100 that enables a user to access external services that supply content information about a context of use of appliances and apparatus. Network 100 comprises a DVD player and a TV set 104. DVD player 102 is connected to TV 104 via a data network 106. Network 106 can operate under a variety of networking software architectures such as UPnP, HAVi, and Jini. Home appliances can be connected using different physical media, such as analog connections, IEEE 1394, a phone line, the power lines, ethernet, and a wireless connection. The appliances can communicate directly or via dedicated communication bridges using different communication protocols, such as TCP/IP, IEC 611883, HomePNA, etc. DVD player 102 can be controlled by a remote control 108 via an IR or RF signal 110. Network 100 also comprises a data network 112 that connects to a coffee maker 114 and a kitchen pad 116. Kitchen pad 116 here is a thin client device capable of displaying video and graphics on a display monitor, preferably an LCD accommodated in a rugged, sealed housing to withstand environmental influences such as moisture and playful children. Similar to network 102, network 112 can operate using different software architectures, communication protocols and physical media. Both networks are connected to an Internet gateway device 118, e.g., a PC or a set top box or a home server, that enables communication between network environment 100 and an external server 120 via the Internet 122 or a similar public or private wide area data network. Remote control 108 and the front panel of coffee maker 114 comprise direct service access buttons 124 and 126, respectively.

Figure 3:
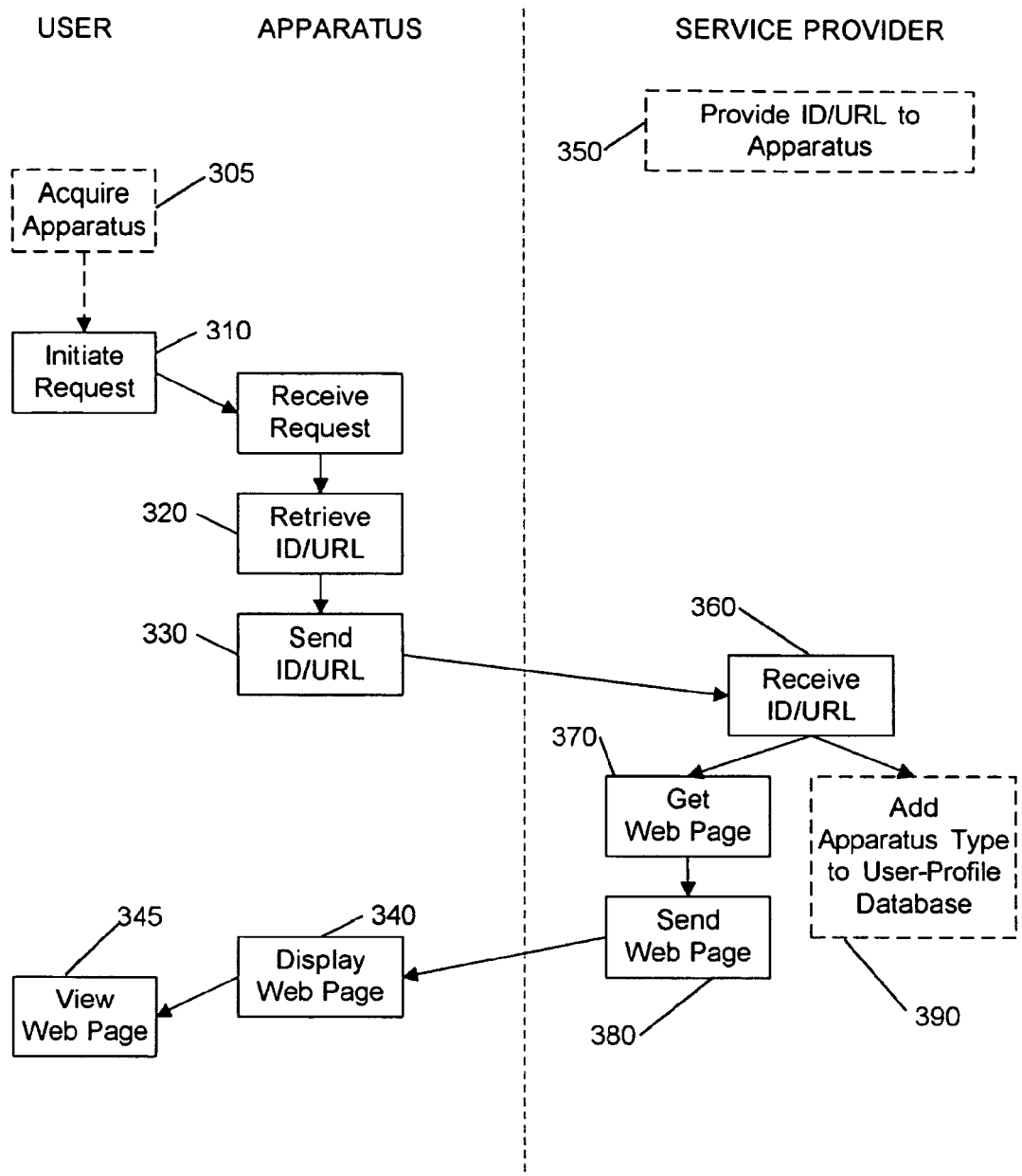
FIG. 3 illustrates an example flow diagram for providing user access to information supply about the context of usage of an apparatus.

FIG. 3 illustrates an example operation of the system of FIG. 1. When the user acquires an apparatus 305 and presses service access button 124 on remote control 108 for DVD player 102 (310 of FIG. 3), the DVD Player 102 retrieves the address of the associated service page from local storage (320) and requests the page from the external server 120 through Internet gateway device 118 (330). When the data is received, the data gets displayed on the display monitor of TV 104 (340) where the user can view the web page 345. The procedure to provide ID/URL to the apparatus 350 is handled by the service provider. The Internet gateway device 118 (330) sends the ID/URL. The service provider receives the ID/URL 360 which is used to get a corresponding web page 370 which is then sent to the user apparatus 380. Upon receipt of the ID/URL 360 the service provider can add the apparatus type to the User-Profile database 390.

The operation listed above, specifically the look up and retrieval of web page addresses, data retrieval, conversion of the data, e.g., a HTML page, into a presentation signal, e.g. video, and finally presentation itself, can be implemented by a variety of embodiments.

Consider as an example a HAVi-based embodiment of the present invention. Network 106 comprises IEEE 1394 devices, including digital TV 104, DVD player 102 and Internet gateway 118. TV 104 implements a HAVi FAV. DVD player 102 and gateway 118 each implement a HAVi BAV. During the run-time, the software device control module (DCM) of DVD player 102 as well as the DCM of gateway 118 are uploaded to the FAV. When the user presses service access button 124 on remote control 108, DVD player 102 communicates the signal to its DCM using an IEEE 1394 interface. The DCM of DVD player 102 uses the HAVi Registry to locate a HAVi WebProxy FCM, which represents the functionality of gateway 118 at the software level. The DCM of DVD player 102 retrieves the address of the associated service page and requests it via the WebProxy FCM from external server 120. When the file is received, the DCM converts the data into video signal, that is presented on the display monitor of TV 104.

Consider as another example a UPnP embodiment of the present invention. DVD player 102 is connected to TV 104 via an S-video cable for analog video. Network 106 is implemented using HomePNA-compatible hardware and software (see, e.g., www.homepna.org). DVD player 102 and Internet gateway 118 can communicate via the TCP/IP protocol. Both of them host UPnP-compatible software and implement their respective device interfaces and message sets (see www.upnp.org/UPnPDevice_Architecture_1.0.htm for further detail).

When the user presses service access button 124 on remote control 108, and if network 106 has not been configured at a previous occasion, DVD player 102 locates Internet gateway 118 using the HTTP multicast mechanism according to the UPnP standard. DVD player 102 obtains the UPnP description document of Internet gateway 118 and obtains the address of its UPnP services required for mapping Internet addresses. Then DVD player 102 uses the Internet Gateway services to obtain the IP address of external server 120. After that, DVD player 102 requests and retrieves the web page data from external server 120 using the HTTP protocol. Upon receipt of the data, DVD 102 converts the data, e.g., an HTML document, into a video signal and sends it via the S-video cable to TV 104.

Consider as yet another example of a UPnP implementation of the invention. Coffee maker 114 is connected to the display of kitchen pad 116 via a proprietary communication protocol. Kitchen pad 116 is connected to Internet gateway 118 using power line based HomePlug hardware and software (see, e.g., www.homeplug.org). Kitchen pad 116 and Internet gateway 118 can communicate via the TCP/IP protocol. Both of them host UPnP-compatible software and implement their respective device interfaces and message sets.

When the user presses service access button 126 on the front panel of coffee maker 114, coffee maker 114 retrieves the address of the service web page, e.g., from internal storage, and sends it to kitchen pad 116. The latter locates Internet gateway device 118 and accesses its services to obtain the IP address of external server 120. Then, kitchen pad 116 requests and retrieves the service web page data from external server 120 using the HTTP protocol. The display of kitchen pad 116 presents the page using embedded Internet browser software. Kitchen pad 116 may cache the service web page locally or on network 112 if the page has not been updated on server 120. Kitchen pad 116 may update the page periodically during idle time in order to have it ready immediately upon the user's request.

A home network may have multiple clusters of apparatus with different software architecture. For bridging multiple software architectures in a CE environment, see the following document incorporated herein by reference:

U.S. Ser. No. 09/340,272 filed Jun. 25, 1999 for Eugene Shteyn for BRIDGING MULTIPLE HOME NETWORK SOFTWARE ARCHITECTURES. This document relates to integrating home networks of different software architectures. References to software representations of devices and services on a first one of the networks are automatically created. The references are semantically sufficient to enable automatic creation of at least partly functionally equivalent software representations for a second one of the networks so as to make the devices and services of the first network accessible from the second network.

U.S. Ser. No. 09/616,632 filed Jul. 26, 2000 for Jean Moonen and Eugene Shteyn for SERVER-BASED MULTI-STANDARD HOME NETWORK BRIDGING. This document relates to bridging home networks. The bridge in the home network couples first and second clusters of devices. The clusters have different software architectures. The bridge is connected to a server on the Internet. This server offers a lookup service for some set of standards, and allows a bridge to locate and download the appropriate translation modules for allowing a device in the first cluster to interact with the second cluster.

U.S. Ser. No. 09/624,648 filed Jul. 25, 2000 for Jean Moonen for UI-BASED HOME NETWORK BRIDGING. This document relates to a home network that comprises a UPnP cluster and a HAVi cluster. UPnP uses programmatic device interfaces that are based on standardized messages being sent between the devices. HAVi also uses programmatic interfaces but needs to know the proper device type and FCMs in advance. In addition, the current UPnP and HAVi standards do not define devices that can readily be mapped onto one another owing to semantic differences. To overcome this problem, the clusters are bridged by representing a UPnP device on the HAVi cluster, wherein the UPnP device's description document is used to generate a HAVi DDI target to enable UI-based control of UPnP devices through a HAVi UI.

Figure 2:
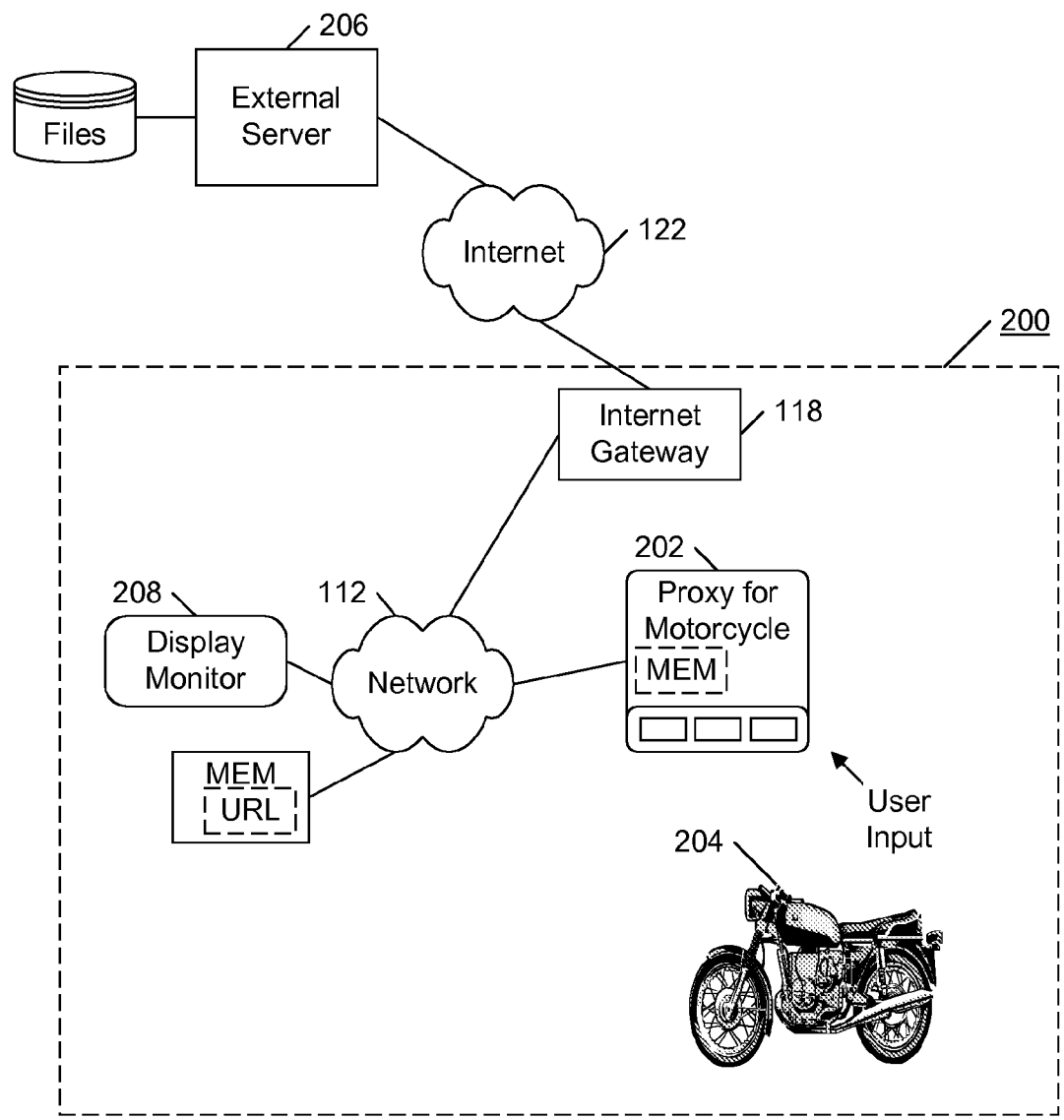

FIG. 2 is a block diagram of a home environment 200 that comprises a proxy device 202 for representing a classic transversal-boxer-twin motorcycle 204 on home network 112. Proxy 202 is physically located, for example, in the garage of the user where motorcycle 204 is parked when not in use. Proxy 202 is connected to network 112 wired or via a wireless fashion, and could even be installed on motorcycle 204 itself in the form of a beacon that is capable of sending a message to network 112 when triggered by the user. When the user triggers proxy 202, e.g., via an IR or RF remote control, a voice command, a button or another suitable user input, proxy 202 causes network 112 to contact an external server 206 to request a specific page indicated by a specific URL. The URL can be stored on network 112, in proxy 202, or in look up table at gateway 118. Server 206 is maintained by a special interest group or by the manufacturer or importer of this brand of motorcycles. Server 206 provides context information about these motorcycles, e.g., maintenance tips, information about tools and where to purchase them, riding gear such as protective clothing, upcoming events in the geographical neighborhood of the user (that for this type of motorcycle can easily have a range of 3000 miles), availability of spare parts, etc., etc. The proximity of proxy 202 to motorcycle 204 intuitively merges motorcycle 204 into a user-interface to this server 206. As a result, proxy 202 lets the user perceive motorcycle 204 to have become the entrance to topical server 206. Home environment 200 is configured to render the web page retrieved from this server 206 on a display monitor 208. For example, environment 200 has a look up table that associates the URL with a specific output device such as monitor 208. Monitor 208 is located, in this example, in the garage, or it is a functional part of a touch screen remote control device used to trigger proxy 202, etc.

The motorcycle example explained above illustrates how the proxy makes a legacy apparatus, i.e., an apparatus without network communication capabilities, an intuitive user interface to a topical server within the context of usage of the apparatus. Accordingly, a home network capable of providing access to topical services can be implemented by letting the user intuitively associate a legacy apparatus with an Internet service through an aftermarket proxy. The proxy is capable of initiating the fetching of the topical web page from a specific server via a gateway on the home network upon registering a user input. The proxy can be a very simple device as specified above.

An example of an implementation of a proxy is a device that is capable of communicating a URL to the home network or the gateway upon being triggered by the user. Businesses, manufacturers or Internet Service Providers can market such a device with a pre-programmed URL. The device is installed near or at the apparatus it is to represent in order to let the user make the intuitive link between the apparatus and the service.

As another example, the proxy is capable of sending a unique identifier to an intermediate device that converts the identifier into a URL, e.g., according to a look-up table, and connects to the topical server via the gateway on the home network and request the page or file based on the URL. An ISP can download these re-configured look-up tables for installation on a PC or a set top box, thus being able to generate a revenue stream from the URL owners. For example, the proxy comprises a label that can be attached to a surface of an apparatus. The label has printed, passive components, among which an antenna formed by one or more loops of electrically conductive material. The antenna picks up a primary RF signal sent by a pointing device held by the user. The frequency of the primary RF signal gets modified through a non-linear element in the antenna loop. As a result a secondary RF signal is sent out by the antenna, now with a different frequency so as interfering with the primary signal. The signal transmitted is picked up by the pointer device or another component on the home network. The secondary signal carries a unique signature of the label. For example, the frequency of the secondary signal is used to identify the label. Alternatively, the secondary signal is modulated by circuitry in the label that gets powered by the primary signal. In this manner, each label can be distinguished from other labels and can be identified by the pointing device or the component on the home network. The identity of the label is associated with the apparatus and thus can serve as the input to a look-up table, the output of which gives the URLs of files at topical servers. This conversion can take place, e.g., in the pointing device that in turn is capable of sending the proper request, based on the URL, to the gateway on the home network. Again, the apparatus has become part of the intuitive user interface by virtue of the label's identity that can be remotely sensed. The pointing device can be accommodated in a mobile phone or in a remote control device such as the PRONTO™ or in another handheld device with browsing capability, etc.

As is clear, the proxy can be made an extremely simple device. It merely has to enable to forward an identifier when triggered by the user so that a request with a corresponding URL can be sent over the Internet.

The URLs can be provided from the home environment as illustrated above. For example, the URLs are stored at the apparatus for which topical servers exist, or they are stored at the proxies, or at the gateway of the home network.

Alternatively, the URLs are stored elsewhere, e.g., at a server of the ISP or at a special server of a third party. The ISP or third party maintains a look-up table or another conversion means that translates an identifier representative of a type of apparatus and sent from the home network into a URL of a web page or file at a topical server. The home network then sends to a particular server on the Internet an identifier of the apparatus for which topical content information is being sought. The geographic location of the user's home network or the user-profile, e.g., based on user history, is preferably taken into consideration to create a customized conversion of identifiers to URLs.

What is claimed is:

1. A consumer appliance, comprising:
   an input component responsive to a user-input for initiating retrieval of data by the consumer appliance from a server based on a predetermined URL or an identifier associated with the consumer appliance, the data representing content information about the context of usage of the consumer appliance, wherein the consumer appliance does not require a user to access a web browser or other device in order for the consumer appliance to initiate retrieval of the data.

2. The consumer appliance of claim 1, wherein the consumer appliance configured for use on a home network and having an Internet-access functionality through the home network, the predetermined URL or the identifier being stored on the home network.

3. The consumer appliance of claim 1, further comprising a memory for storage of the URL or the identifier.

4. The consumer appliance of claim 1, wherein:
   the consumer appliance has a remote control device; and
   the remote control device has a dedicated button for initiating the retrieval of the data.

5. A proxy device for representing a consumer appliance on a home network, wherein the proxy device is responsive to a user-input to the consumer appliance for initiating, via a gateway, retrieval of data from a remote server based on a predetermined URL or an identifier associated with the consumer appliance, the URL or the identifier being stored on the home network.

6. The proxy device of claim 5, wherein the data represents content information about the context of usage of the consumer appliance.

7. The proxy device of claim 5, wherein the proxy device is configured to store the URL or the identifier.

8. The proxy device of claim 7, wherein the URL or the identifier is programmable.

9. The proxy device of claim 5, wherein the proxy device is configured to be responsive to a wireless signal.

10. The proxy device of claim 9, wherein the proxy device is configured to transmit a further signal with a unique identifier upon receiving the signal.

11. A remote control device for control of a consumer appliance included on a home network, wherein:
    the device has a key dedicated to enabling the consumer appliance to initiate without further user input retrieval of data from a server based on a predetermined URL or an identifier associated with the consumer appliance and stored on the home network; and
    the data represents content information specific to the context of usage of the consumer appliance.

12. The device of claim 11, wherein an identifier representative of a URL of a file is stored at the server.

13. A method of enabling a service provider to provide a service via the Internet to a user of a consumer appliance having a predetermined identifier, the identifier being stored on a home network that includes the consumer appliance, the method comprising:
    enabling the user by a single user input to the consumer appliance to have the consumer appliance initiate sending a request with the identifier representative of a type of the consumer appliance to a server on the Internet through the home network; and
    based on the identifier, the server initiating access to a web page with content information about a context of using the consumer appliance.

14. The method of claim 13, further comprising creating a data base of the type per user.

15. The method of claim 13, further comprising creating a data base of URLs or identifiers per user.

* * * * *